United States Patent [19]
Bardon et al.

[11] Patent Number: 6,052,130
[45] Date of Patent: Apr. 18, 2000

[54] DATA PROCESSING SYSTEM AND METHOD FOR SCALING A REALISTIC OBJECT ON A USER INTERFACE

[75] Inventors: Didier Daniel Bardon; Denise Marie Burton, both of Austin; Scott Harlan Isensee, Georgetown; Scott Anthony Morgan, Austin; John Martin Mullaly, Austin; Craig Ardner Swearingen, Austin, all of Tex.

[73] Assignee: International Business Machines Corporation, Armonk, N.Y.

[21] Appl. No.: 08/753,124

[22] Filed: Nov. 20, 1996

[51] Int. Cl.[7] .................................................. G06T 3/00
[52] U.S. Cl. ............................................................ 345/439
[58] Field of Search .................................. 345/439, 433, 345/340–346

[56] References Cited

U.S. PATENT DOCUMENTS

| | | | |
|---|---|---|---|
| 4,868,765 | 9/1989 | Diefendorff | 364/521 |
| 4,899,136 | 2/1990 | Beard et al. | 340/706 |
| 4,939,507 | 7/1990 | Beard et al. | 340/706 |
| 5,060,135 | 10/1991 | Levine et al. | 364/200 |
| 5,113,517 | 5/1992 | Beard et al. | 364/200 |
| 5,261,044 | 11/1993 | Dev et al. | 395/159 |
| 5,276,785 | 1/1994 | Mackinlay et al. | 395/127 |
| 5,295,243 | 3/1994 | Robertson et al. | 395/160 |
| 5,335,323 | 8/1994 | Kolnick | 395/164 |
| 5,347,295 | 9/1994 | Agulnick et al. | 345/156 |
| 5,355,447 | 10/1994 | Knowlton | 395/139 |
| 5,375,165 | 12/1994 | Haber et al. | 379/90 |
| 5,388,202 | 2/1995 | Squires et al. | 395/157 |
| 5,455,689 | 10/1995 | Taylor et al. | 358/450 |
| 5,479,603 | 12/1995 | Stone et al. | 395/161 |
| 5,485,569 | 1/1996 | Goldman et al. | 395/159 |
| 5,487,143 | 1/1996 | Southgate | 395/157 |
| 5,491,781 | 2/1996 | Gasperina | 395/157 |
| 5,499,334 | 3/1996 | Staab | 395/157 |
| 5,517,578 | 5/1996 | Altman et al. | 382/181 |
| 5,522,025 | 5/1996 | Rosenstein | 395/158 |
| 5,524,199 | 6/1996 | Orton et al. | 395/157 |
| 5,526,478 | 6/1996 | Russell, Jr. et al. | 395/154 |
| 5,544,302 | 8/1996 | Nguyen | 395/161 |
| 5,550,967 | 8/1996 | Brewer et al. | 395/155 |
| 5,734,597 | 3/1998 | Molnar et al. | 364/705.08 |

OTHER PUBLICATIONS

*Microsoft OS/2™ Programmer's Reference*, vol. 1, Document No. LN0702A–110–R00–0289, published by Microsoft Press, Redmond, Washington, 1989, pp. 64, 71, 112, 119–120.

Burge, Thomas E. and Celi, Joseph Jr., *Advanced OS/2™ Presentation Manager Programming*, published by John Wiley & Sons, Inc., New York, New York, pp. 37–38.

*The Windows Interface, An Application Design Guide*, Document No. PC28921–0692, published by Microsoft Press, Redmond, Washington, 1992, p. 126.

(List continued on next page.)

*Primary Examiner*—Almis R. Jankus
*Attorney, Agent, or Firm*—Winstead Sechrest & Minick P.C.; Anthony V. S. England

[57] ABSTRACT

A data processing system, software program, and method scale the contents of a window or similar display area in unison and in proportion. During operation, all of the contained control, text, and images included in the window are scaled proportionately so that a user is still able to use the displayed object and the displayed object retains its characteristic image. Composite images of realistically-rendered objects are resized and moved in a manner which is dependent upon a common non-changing representation of a container and a contained object displayed on a display device. When the common non-changing representation is modified by resizing, a scaling operation is performed on the composite image as a whole. However, when the representation of a contained object is modified and the common non-changing representation is no longer displayed, a region of a contained object is "clipped out" from the container before the image is displayed. The contained object is then allowed to display its image as is required in light of the movement and resizing operations desired by the user.

28 Claims, 8 Drawing Sheets

OTHER PUBLICATIONS

Muller, Nathan, "Dial 1–800–Internet," *Byte*, Feb., 1996, pp. 83–84, 86, 88.

Wayner, Peter, "Hey Baby, Call Me at My IP Address," *Byte*, Apr., 1996, pp. 142–144.

*Object–Oriented Interface Design, IBM Common User Access™ Guidelines*, 1st Ed., published by Que Corporation, Carmel, Indiana, Dec., 1992, 43–45, 55–57, 235, 329, 342, 497, and 654.

U.S. Patent Application Serial No. 08/753081, entitled "Creating Real–World Objects" (Attorney Docket No. AT9–96–204).

U.S. Patent Application Serial No. 08/753077, entitled "Prioritization of Background Display During Animation" (Attorney Docket No. AT9–96–213).

U.S. Patent Application Serial No. 08/753122, entitled "Multifunctional Object" (Attorney Docket No. AT9–96–214).

U.S. Patent Application Serial No. 05/753076, entitled "System and Method for Maintaining Size and Position Relationships for Non–Rectangular Real World Objects" (Attorney Docket No. AT9–96–237).

U.S. Patent Applicaiton Serial No. 08/753,078, entitled "Data Processing System and Method for Viewing Objects on a User Interface" (Attorney Docket No. AT9–96–241).

U.S. Patent Application Serial No. 08/753,079, entitled "Data Processing System and Method for Performing Automatic Actions in a Graphical User Interface" (Attorney Docket No. AT9–96–242).

U.S. Patent Application Serial No. 08/753,123, entitled "A Data Processing System and Method for Modifying a Size of a Realistic Object on a User Interface" (Attorney Docket No. AT9–96–246).

U.S. Patent Application Serial No. 08/753,082, entitled "A Data Processing System and Method for Controlling a View of a Realistic Object In a Display Device" (Attorney Docket No. AT9–96–212).

DATA PROCESSING SYSTEM AND METHOD FOR SCALING A REALISTIC OBJECT ON A USER INTERFACE

CROSS-REFERENCE TO RELATED APPLICATIONS

The present application is related to the following applications:

Ser. No. 08/753,081, entitled "CREATING REAL-WORLD OBJECTS" (Attorney Docket No. AT9-96-204) pending;

Ser. No. 08/753,082, entitled "DATA PROCESSING SYSTEM AND METHOD FOR CONTROLLING A VIEW OF A REALISTIC OBJECT IN A DISPLAY DEVICE" (Attorney Docket No. AT9-96-212) pending;

Ser. No. 08/753,077, entitled "PRIORITIZATION OF BACKGROUND DISPLAY DURING ANIMATION" (Attorney Docket No. AT9-96-213) now U.S. Pat. No. 5,920,325;

Ser. No. 08/753,122, entitled "MULTIFUNCTIONAL OBJECT" (Attorney Docket No. AT9-96-214) now U.S. Pat. No. 5,815,153;

Ser. No. 08/753,076, entitled "SYSTEM AND METHOD FOR MAINTAINING SIZE AND POSITION RELATIONSHIPS FOR NON-RECTANGULAR REAL WORLD OBJECTS" (Attorney Docket No. AT9-96-237) now abandoned;

Ser. No. 08/753,078, entitled "DATA PROCESSING SYSTEM AND METHOD FOR VIEWING OBJECTS ON A USER INTERFACE" (Attorney Docket No. AT9-96-241) now U.S. Pat. No. 5,877,763;

Ser. No. 08/753,079, entitled "DATA PROCESSING SYSTEM AND METHOD FOR PERFORMING AUTOMATIC ACTIONS IN A GRAPHICAL USER INTERFACE" (Attorney Docket No. AT9-96-242) pending; and Ser. No. 08/753,123, entitled "DATA PROCESSING SYSTEM AND METHOD FOR MODIFYING A SIZE OF A REALISTIC OBJECT ON A USER INTERFACE" (Attorney Docket No. AT9-96-246) pending.

All of the above applications are being filed on the same date as the present application and assigned to the assignee of the present application.

TECHNICAL FIELD

The present invention relates in general to data processing systems, and in particular, to the presentation and resizing of objects on a user interface to a data processing system.

BACKGROUND INFORMATION

As computers have developed to provide greater capabilities at greater speeds, the ability of a user to interface with that computer has also become much simpler. For example, icons provide a pictorial representation of a function which may be executed by a computer and allow a user to easily access that function with the simple click of a mouse or a stroke of a return key. Additionally, many current software programs use realistic representations of objects to take advantage of a user's experience with the physical world. Therefore, rather than present the user with a series of panels and window frames or pull-down menus, a software program for implementing an application may present a realistically-rendered object which is placed directly on a desktop or other environment.

While such realistic representations enable a user to more easily interface with the computer, the applications which implement the realistically-rendered objects introduce several problems. For example, the ability to resize the object adds additional challenges for designers of the user interface of a computer system. Traditional applications of such objects provide resizing capabilities by allowing the user to drag the edges of a graphical object or the border of a window. An example of such a window is illustrated in display device 100 of FIG. 1. The window is labeled 102. As is illustrated in FIG. 1, windows in prior art graphical user interfaces (G.U.I.) scale in a non-linear fashion. Stated another way, when the user scales a border of the window 102, the contents do not scale and are clipped or scrolled out of view. As is illustrated in FIG. 1, when window 102 is scaled to a smaller size, a type of application illustrated in window 102 is clipped and a user does not have access to all of the data. Additionally, as may be seen by scroll bars 104 and 106, other data is available for observation, but a user must scroll up or down to access the appropriate information. Furthermore, in the prior art implementation illustrated in FIG. 1, a user must scroll in both a horizontal and a vertical direction to access all of the data included in the window. Such clipping and required scrolling activities disrupt both the function and aesthetic layout of the window of the user interface.

As well, it should be noted that in some applications, a user is not able to even resize a window at all. Such an application is illustrated in the prior art user interface of FIG. 2. FIG. 2 provides a window 202 which does not allow a user to resize it according to a user's requirements. Therefore, a user is required to interface with an inflexible graphical user interface.

While the methodologies described above are used universally and allow a user to modify a window size in a non-linear manner, the use of a window-type environment which is non-linear fails to create a functional and aesthetic layout for use in the graphical user interface. Therefore, it is desirable to take advantage of a computer's capabilities for modifying graphical representations without requiring a user to modify their mental model of such objects. For this reason, a data processing system and method should be developed to interact with a user and to provide controls which fit plausibly into a model of the object being represented to the user on the user interface.

SUMMARY OF THE INVENTION

The previously mentioned needs are fulfilled with the present invention. Accordingly, there is provided, in a first form, a data processing system. The data processing system includes a display device for displaying a composite image having a container object and a contained object, wherein the composite image is in a non-changing state when the contained object is in a first state and the composite image is in a changing state when the contained object is in a second state. The data processing system also includes a user interface for receiving a plurality of control inputs for controlling an appearance of the composite image displayed by the display device. The data processing system also includes a central processing unit which is connected to the user interface for receiving the plurality of control inputs and is connected to the display device to provide a plurality of object control signals for selectively modifying an appearance of the container object and an appearance of the contained object concurrently when the contained object is in the first state and for selectively modifying the appearance of the container object and the appearance of the contained object consecutively when the contained object is in the second state.

There is provided, in a second form, a method for operating a data processing system. In the method, a container object and a contained object are displayed on a display device. A plurality of control inputs are received from a user interface for controlling an appearance of the container object displayed by the display device. The container object is scaled in response to the plurality of control inputs to generate a scaled container object. The contained object is scaled in response to the plurality of control inputs to generate a scaled contained object.

There is provided, in a third form, a method for operating a data processing system. A container object which includes a contained object is displayed in one of a first state and a second state on a display device. A plurality of control inputs is received from a user interface for controlling an appearance of the container object displayed by the display device. An appearance of the container object and the contained object are modified concurrently when the contained object is in the first state. The appearance of the container object and the contained object are modified consecutively when the contained object is in the first state.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 7-B illustrates, in flow diagram form, a remaining portion of the method implemented in FIG. 7-A.

DETAILED DESCRIPTION

Figure 1:
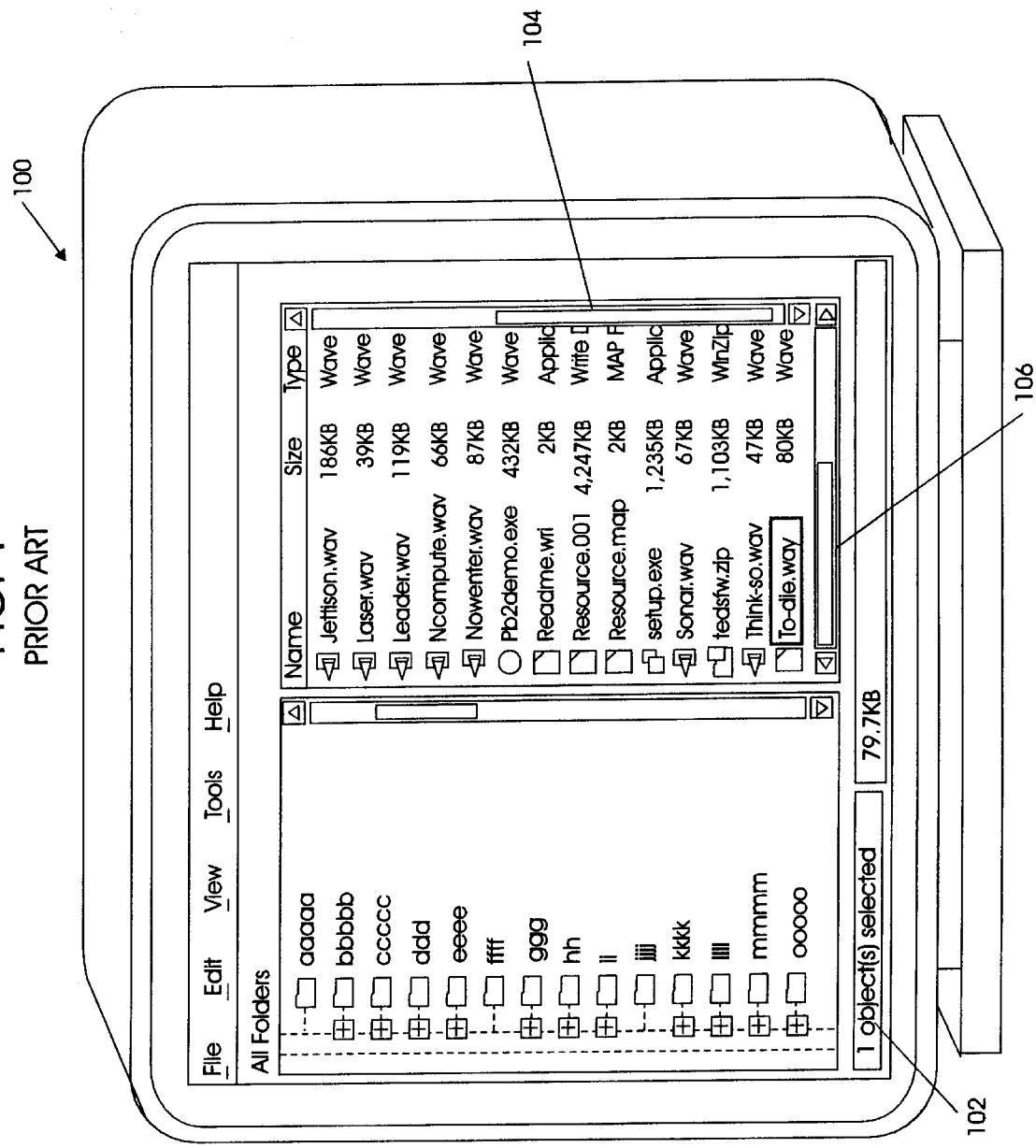
FIG. 1 illustrates, in block diagram form, a display device in accordance with a prior art implementation.
Figure 2:
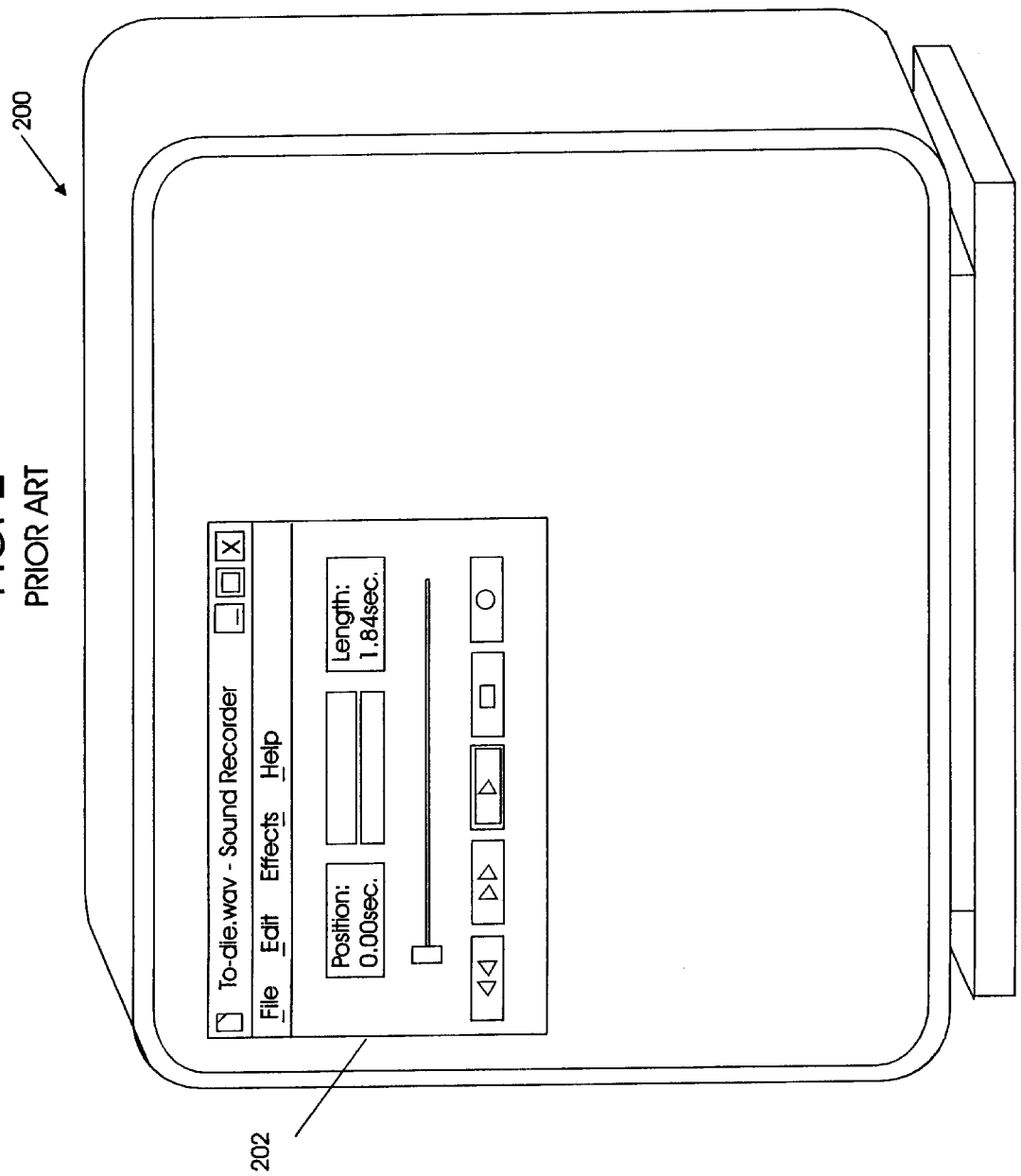
FIG. 2 illustrates, in block diagram form, a display device in accordance with a prior art implementation.

The present invention provides a data processing system, software program, and method for scaling the contents of a window or a similar display area in unison and in proportion. In the present embodiment of the invention, all of the contained controls, text, and images are scaled proportionally so that a user is still able to use the displayed object and the displayed object retains its characteristic image.

Furthermore, in the present invention, a data processing system, software program, and method for resizing and moving composite images of realistically-rendered objects are provided. A composite image generally includes a container and a contained object which are represented in a common non-changing representation. In the present invention, when the common non-changing representation is modified by resizing, a scaling operation is performed on the composite image as a whole. However, when the representation of the contained object is modified and the common non-changing representation is no longer displayed, the present invention provides a methodology for "clipping out" a region of the contained object from the container before displaying its image. The contained object is then allowed to display its image as is required in light of the movement and resizing operations desired by a user. The operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 3:
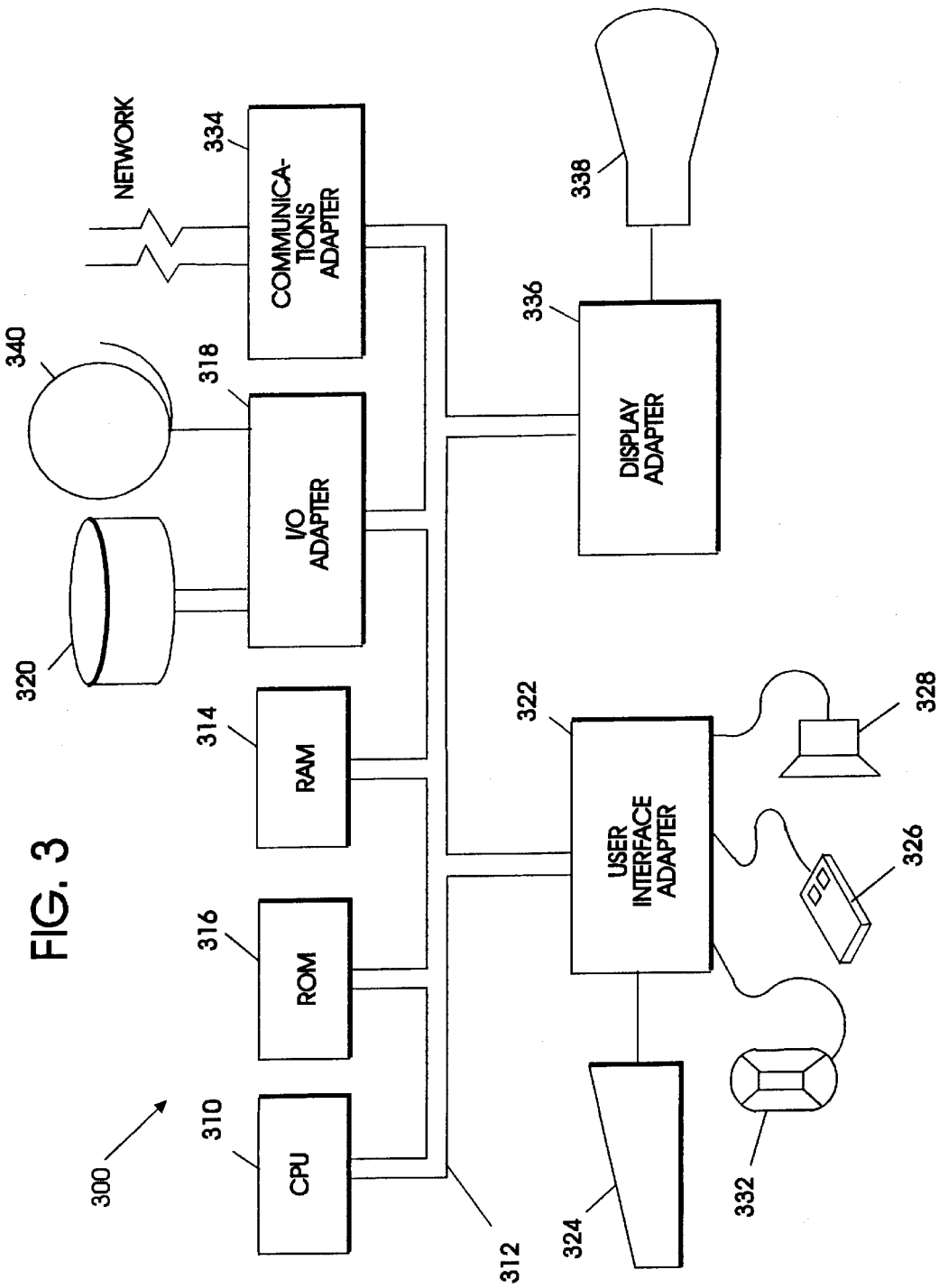
FIG. 3 illustrates, in block diagram form, a data processing system in accordance with one embodiment of the present invention.

A representative hardware environment for practicing the present invention is depicted in FIG. 3, which illustrates a typical hardware configuration of a workstation in accordance with the subject invention having central processing unit (CPU) 310, such as a conventional microprocessor, and a number of other units interconnected via system bus 312. The workstation shown in FIG. 3 includes random access memory (RAM) 314, read only memory (ROM) 316, and input/output (I/O) adapter 318 for connecting peripheral devices such as disk units 320 and tape drives 340 to bus 312, user interface adapter 322 for connecting keyboard 324, mouse 326, speaker 328, microphone 332, and/or other user interface devices such as a touch screen device (not shown) to bus 312, communication adapter 334 for connecting the workstation to a data processing network, and display adapter 336 for connecting bus 312 to display device 338. CPU 310 may include other circuitry not shown herein, which will include circuitry commonly found within a microprocessor, e.g., execution unit, bus interface unit, arithmetic logic unit, etc. CPU 310 may also reside on a single integrated circuit.

An embodiment of the present invention is illustrated in FIG. 3. In this embodiment, assume a software program which implements the present invention is stored in either ROM 316 or RAM 314 and execution of this software program is controlled by CPU 310. By accessing the software program in either ROM 316 or RAM 314, a real-world object is displayed to the user on display device 338. In the following description of the invention, the real-world object which will be discussed is a telephone. However, it should be noted that the present invention may be expanded to apply to other real-world objects, not described in detail herein. Examples of such other real-world objects include, but are not limited to, desks, file cabinets, personal digital assistants, and calculators.

Figure 4:
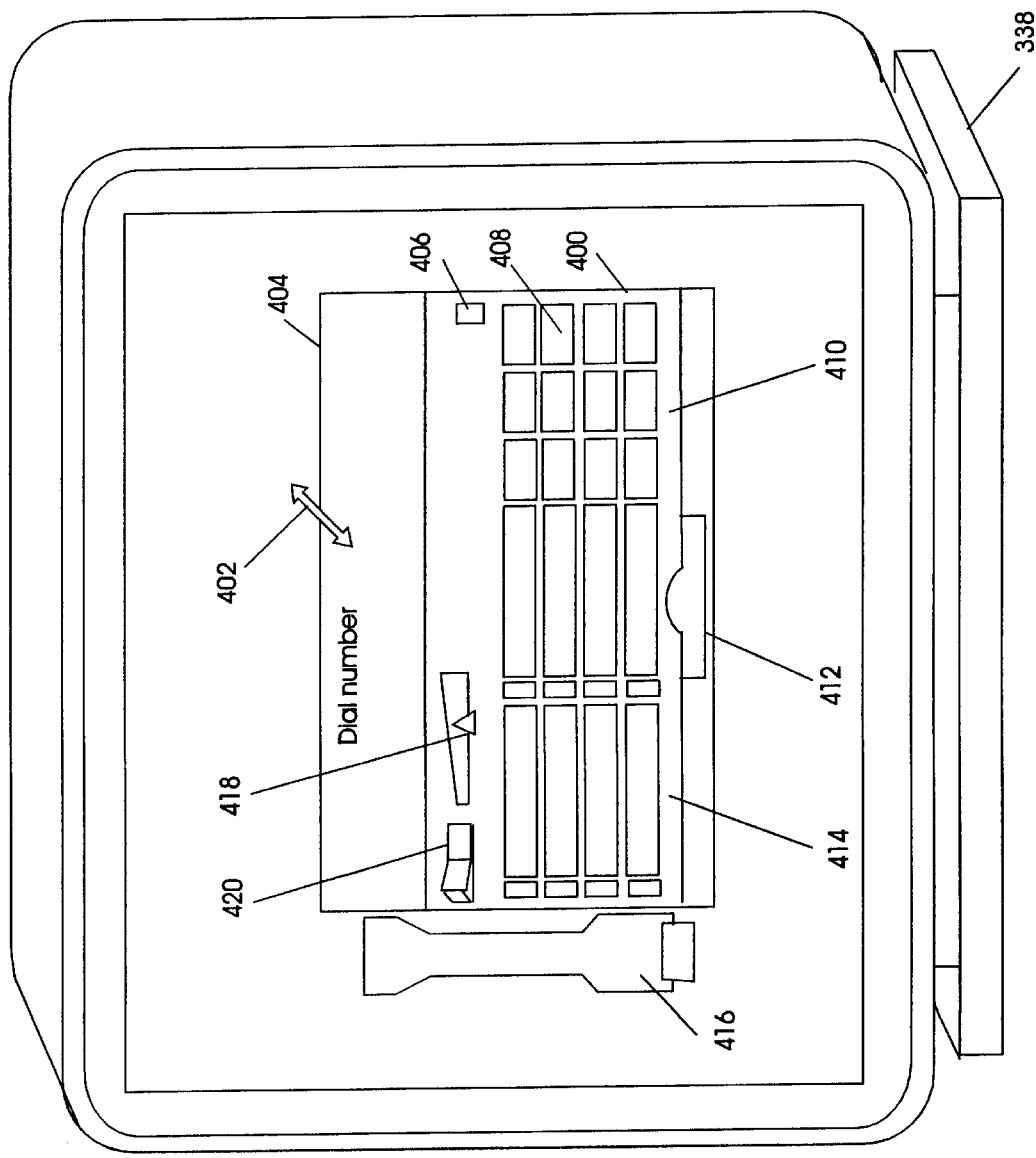
FIG. 4 illustrates, in block diagram form, a display device in accordance with one embodiment of the present invention.

Referring to FIG. 4, the realistically-rendered telephone of the present invention is illustrated as it appears on display device 338. Telephone 400 comprises a message interface 404, a help interface 406, a plurality of number selectors 408, a plurality of function selectors 410, a pull-down drawer 412, a plurality of programmable numbers 414, a handset 416, a volume controller 418, and a view selector 420. Furthermore, as illustrated on display device 338, a cursor 402 is provided. Note that cursor 402 appears as a double-pointed diagonal arrow positioned at the edge of telephone 400. When cursor 402 is in another portion of display device 338, cursor 402 appears as a straight arrow having one pointed end.

Control of cursor 402 is provided from a user interface such as keyboard 324, mouse 326, or microphone 332. The input signals provided to one of the aforementioned user interfaces is provided to user interface adapter 322 and subsequently processed by CPU 310 using programs stored in either of ROM 316 or RAM 314. Such control is well-known to those with skill in the data processing art and will not be described in greater detail herein.

To use phone 400 of the present invention, the user is able to emulate real life actions by moving cursor 402 to the receiver and enabling it in an appropriate manner. For example, as mouse 326 is used to control cursor 402, a user would be required to move cursor 402 to handset 416 and click thereon. If keyboard 324 is being used to control cursor 402, pressing the "enter" key will enable telephone 400 to answer an incoming call. Additionally, pressing "delete" will enable a user to terminate a call by hanging up. Each of the plurality of programmable numbers 414 is used to store a telephone number which may be called after handset 416 is "picked up."

If a user desires only to dial one of the programmed numbers, selector 420 may be switched to hide the plurality of number selectors 408. During the telephone call, message interface 404 displays call information and volume controller 418 may be moved to set a volume level for the telephone conversation. If a user desires to change a size of telephone 400, a user must first move their cursor to an edge of telephone 400 where the cursor (402) is configured as a diagonal arrow with pointers at both ends. This special form of a cursor, such as illustrated by cursor 402, indicates that a user is on a boundary of an object when that object is not included in a window or rounded by a special box as is done in prior art implementations.

After cursor 402 is placed on the edge of telephone 400, telephone 400 may be sized according to a user's preference. When cursor 402 is placed at the edge of telephone 400 and engaged to resize telephone 400 by clicking on a mouse or typing on a keyboard, telephone 400 becomes anchored at the farthest point from a quadrant in which cursor 402 is located. After cursor 402 has been placed over any edge of telephone 400, cursor 402 may be dragged either inward or outward to stretch or shrink telephone 400 while maintaining its proper proportions. The sizing is affected by dragging cursor 402 inward or outward modifies both the vertical and the horizontal dimensions of telephone 400 in a proportional manner. A typical manner in which an object is sized is described in *Object-Oriented Interface Design, IBM Common User Access Guidelines*, First Edition, published by QUE Corporation in December 1992, which is hereby incorporated by reference.

Figure 5:
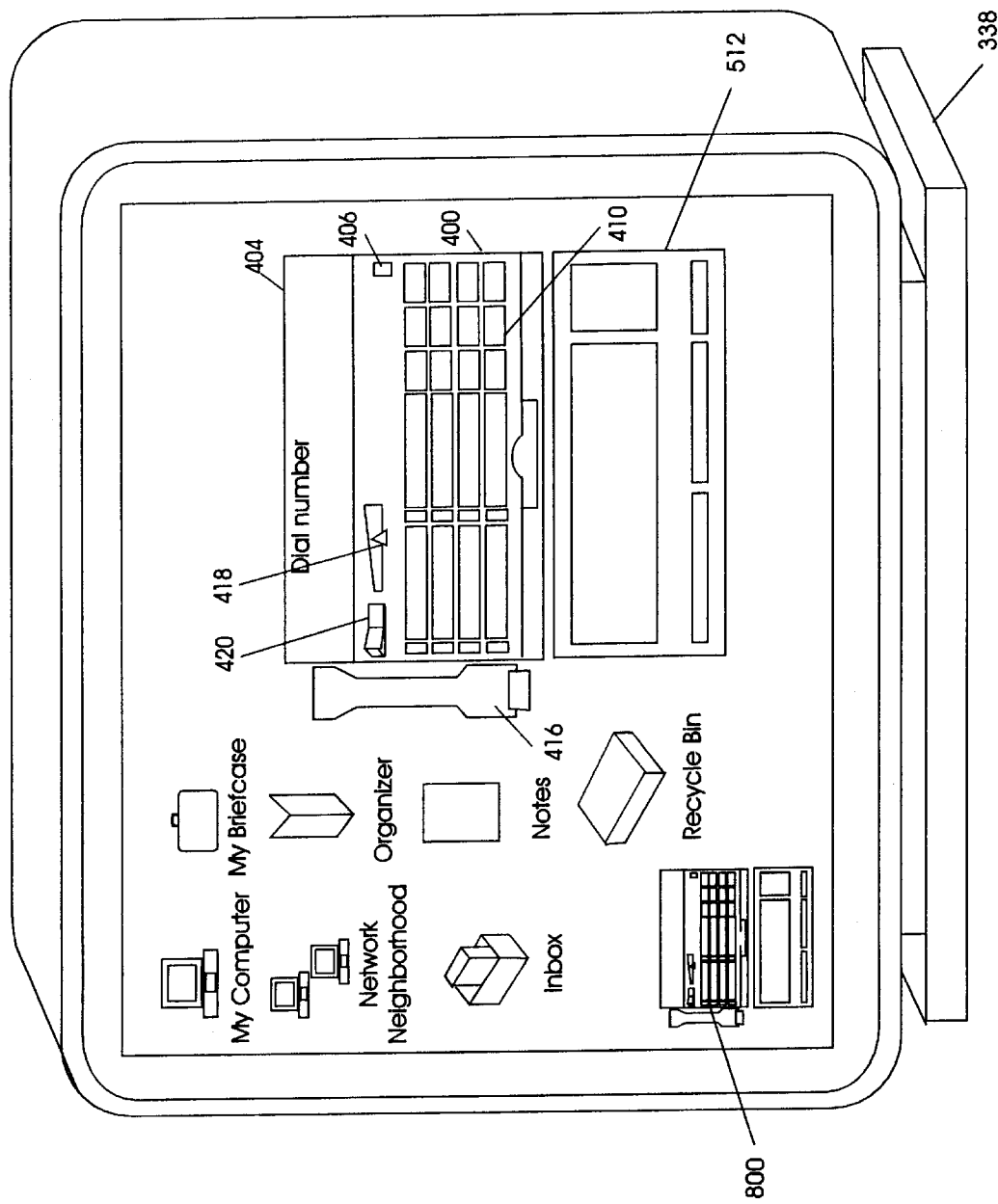
FIG. 5 illustrates, in block diagram form, a display device in accordance with one embodiment of the present invention.

It has been noted that telephone 400 includes pull-down drawer 412. An example of a realistically-rendered telephone which has an open pull-down drawer is illustrated in FIG. 5. The open drawer is referred to as open drawer 512. Open drawer 512 provides a means of setting speed dials. It could also include an address book or other reference information.

It should be noted that in the following discussion, when pull-down drawer 412 of telephone 400 is closed, a resulting image is referred to as a composite image which has a common non-changing representation. Note also that when pull-down drawer 412 of telephone 400 is open, the resulting image is referred to as a composite image without a common non-changing representation. Stated another way, when telephone 400 is viewed, and pull-down drawer 412 is closed, the closed representation of pull-down drawer 412 is included in a composite image of telephone 400. However, when pull-down drawer 412 is open (as illustrated in FIG. 5), a view of pull-down drawer 412 when closed is clipped from the representation of telephone 400 and an opened pull-down drawer 512 is sized and moved together with the remaining portion of telephone 400, but is treated as two separate, but related images, rather than as a single image.

The recognition that both the telephone and pull-drawer components of the composite image may be sized and moved as a single image when the pull-down drawer is closed allows telephone 400 to be moved and sized more smoothly and with less software overhead. The methodology used to implement the present invention will be described in further detail herein.

In addition to the ability to move and resize a composite image in response to a non-changing component of that composite object, the present invention provides a methodology for scaling the contents of a window of similar display area proportionally and in unison. When using this methodology, all of the controls, text, and images contained within an object are scaled in a proportional manner. In using this methodology, each of the contained controls, text, and images is viewed as a separate object contained within a larger object. Thus, the plurality of number selectors 408, the plurality of function selectors 410, the plurality of programmable numbers 414, handset 416, volume controller 418, and view selector 420, are each viewed as separate objects which must be viewed within telephone 400. Each of these objects, including the text associated therewith, is sized proportionally when telephone 400 is sized in response to control signals provided by a user interface device.

The procedure and methodology for implementing each of these characteristics of the present invention will subsequently be described in greater detail.

Figure 6:
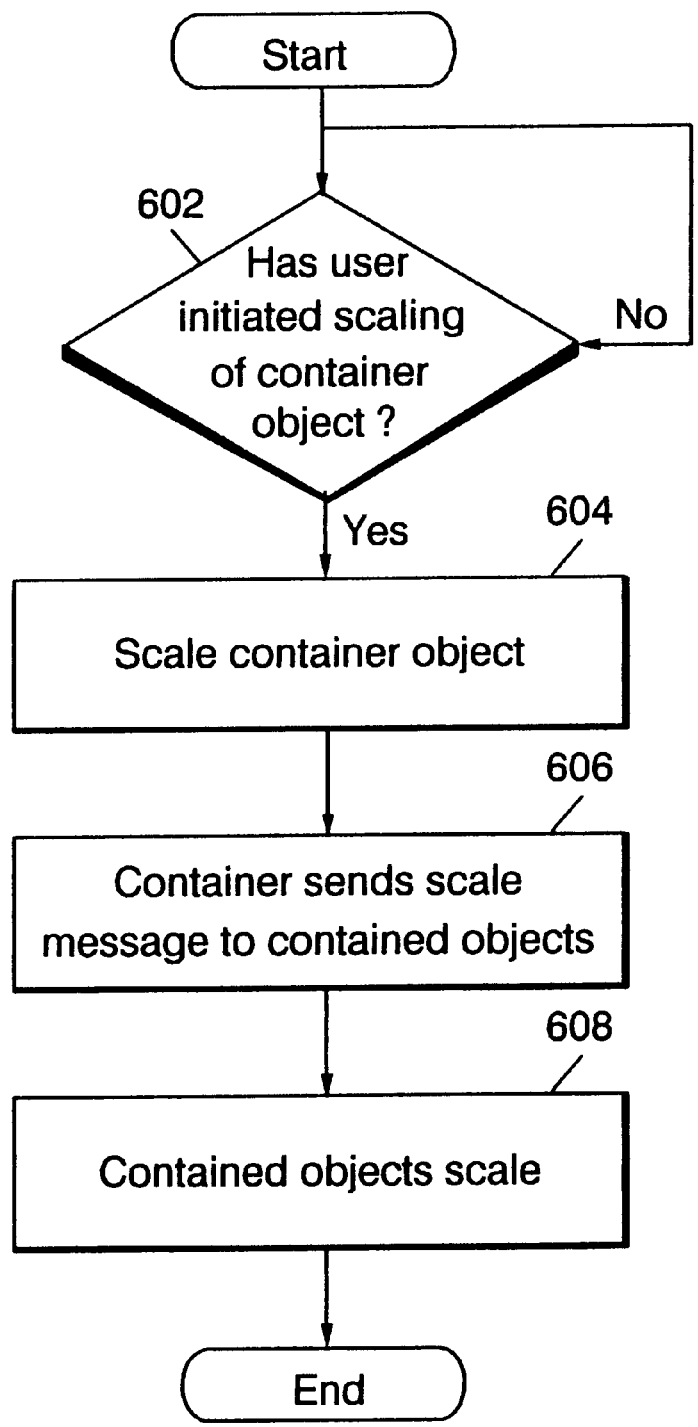
FIG. 6 illustrates, in flow diagram form, a methodology for proportionally scaling a realistically-rendered object in accordance with one embodiment of the present invention.

FIG. 6 illustrates a flow chart for the software which is used to scale a realistically-rendered object on a display device. FIG. 5 illustrates such a resizing operation between telephone 400 and small telephone 800. As described above, small telephone 800 is sized in a proportional manner to telephone 400 and still retains its functionality. Thus, a user is able to place a telephone call on both telephone 400 and small telephone 800 with equal ease. To scale small telephone 800 to be the size of telephone 400, or vice versa, it must first be determined whether or not a user has initiated scaling of a container object in step 602 of the flow chart. To determine whether or not a user has initiated scaling of the container object, it must be determined whether or not a user interface device has positioned a cursor (402) over the edge of an object on the display device. The software used to implement this methodology is stored in one of ROM 316 or RAM 314 and is controlled by CPU 310 upon receipt of inputs from each of the plurality of user interface devices 324, 326, 328, and 332, as received and adapter by user interface adapter 322.

To determine when a cursor is over an edge of the object, or in this case the telephone, a border width must first be defined. After the border width definition is determined, an interface move event is captured when a cursor is over the real-world object or the phone. Subsequently, the position of the interface device is stored for that move event. Again, this data may be stored in a memory such as RAM 314 of the computer system illustrated in FIG. 3. A position is then calculated one border width below the original position. At a subsequent step, it is determined whether or not the new position is over the real-world object or phone. If the new position A is not over the phone, it is determined that the cursor is over the border and the cursor should be modified to be a diagonal, double-pointed arrow. If the new position is over the phone, a new position A is calculated which is one border width above the original position. Again, it is determined whether or not the new position is over the phone. If the new position is over the object, a new position B is calculated one border width to the left of the original position. If the new position B is not over the phone, then it is determined that the cursor is over a border of the phone. Next, it must be determined whether or not new position B calculated to be to the left of the original position is over the phone. If not, it is determined whether the cursor is over a border of the phone. If the cursor is over the border of the phone, new position C is calculated one border width to the right of the original position. If the new position is over the phone, it is determined that the cursor is not over a border of the phone. If new position C is not over the phone, it is determined that the user interface is over a border of the phone. When the software determines that the user interface is over a border of the real object, or phone, the cursor which reflects the movement of the user interface is modified from being an arrow with one point to a diagonal arrow with two points to indicate that a resizing operation will occur in two directions.

Next, an anchor point is selected which is in a farthest point from quadrant in which the cursor is located. After the cursor has been placed over the edge of the telephone, the cursor may be dragged either inward or outward to stretch or shrink the realistically-rendered object.

While the cursor is being dragged inward and outward, a scaled message is provided to CPU 310 to indicate a manner in which the container, or object in which the smaller functions or objects are implemented, should be scaled. CPU 310 subsequently provides control information to display adapter 336 to enable display device 338 to display a newly sized realistic object in step 604. After the container object has been scaled, CPU 310 scales each of the contained objects which were included in the scaled container object. The scaled message provided by CPU 310 enables each of the contained objects and the text associated therewith to be scaled in a manner which is proportional to the larger container object in step 606. Consequently, in step 608, the contained objects are scaled accordingly.

Thus, applying the flow chart of FIG. 6 to telephone 400 of FIG. 4, it must first be determined whether or not a user has initiated a scaling operation of telephone 400. As previously mentioned, to initiate a scaling operation, cursor 402 must be placed at a border of or within telephone 400 and a proper user control must be provided to indicate that cursor 402 will be used to resize telephone 400. Next, in step 604, telephone 400 is scaled in accordance with the user inputs provided by user interface device 324, 332, 326, or 328. Each of the contained objects within telephone 400 then receives a message from CPU 310 that the objects and the text associated with those objects should be resized. Thus, each of the plurality of numbers selectors 408, the plurality of function selectors 410, the pull-down drawer 412, the plurality of programmable numbers 414, the handset 416, the volume controller 418, and the view selector 420 are uniquely scaled in a manner proportional to that of telephone 400.

Such a scaled representation of telephone 400 is illustrated in FIG. 5, wherein small telephone 800 may be stretched to be a same size and proportion as telephone 400 and telephone 400 may be shrunk to be a same size and proportion as small telephone 800. This portion of the present invention reflects the need of real-world objects on a display device to be resized as a whole. Stated another way, a resize operation will apply to the entire object and not to a part of the object over which the cursor is currently positioned. As well, the resizing operations of the present invention will occur at two directions, horizontal and vertical, with an anchor point being determined based on a quadrant of the object which was accessed. This allows the proportionality of the object's appearance to always be maintained and results in a natural and intuitive resizing technique that will be comfortable to current users of windowed systems while maintaining the look and feel of the real-world object paradigm.

As previously mentioned, the present invention also provides optimal performance for objects which contain other objects during a scaling operation. As previously mentioned, with a real-world object, such as a desk, wherein the desk is a container object and a drawer in a desk is a contained object, several problems may arise. In this example, the drawer is a separate object that can be opened and closed. When the desk is scaled, the drawer should be scaled, whether it is opened or closed. Similarly, with a telephone such as that illustrated in FIGS. 4 and 5, the telephone is a container object and pull-down drawer 412 is a contained object. Thus, whether or not the pull-down drawer 412 is opened or closed, the drawer should be scaled accordingly.

Figure 7A:
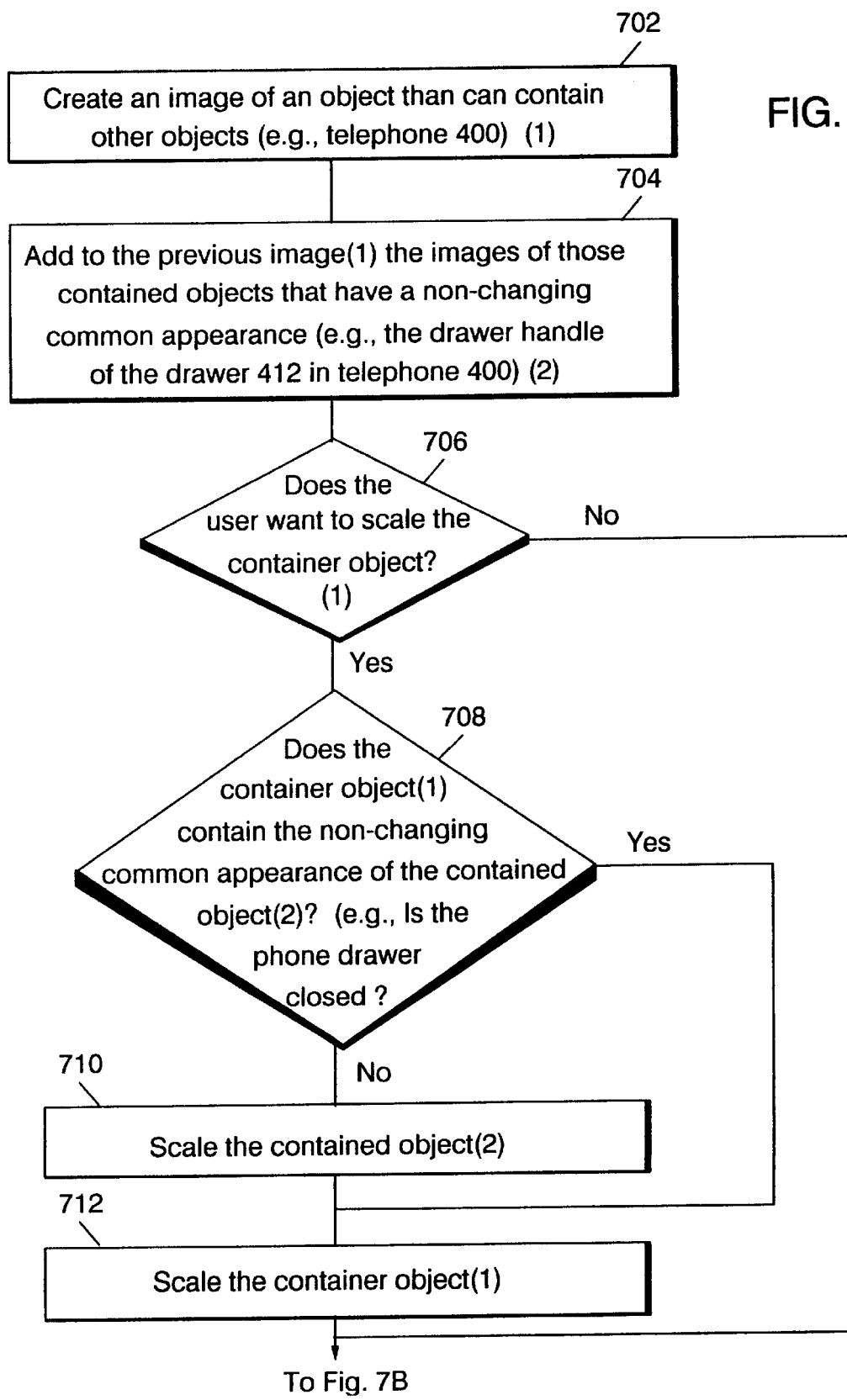
FIG. 7-A illustrates, in flow diagram form, a methodology for scaling an object within a realistically-rendered object in accordance with one embodiment of the present invention.
Figure 7B:
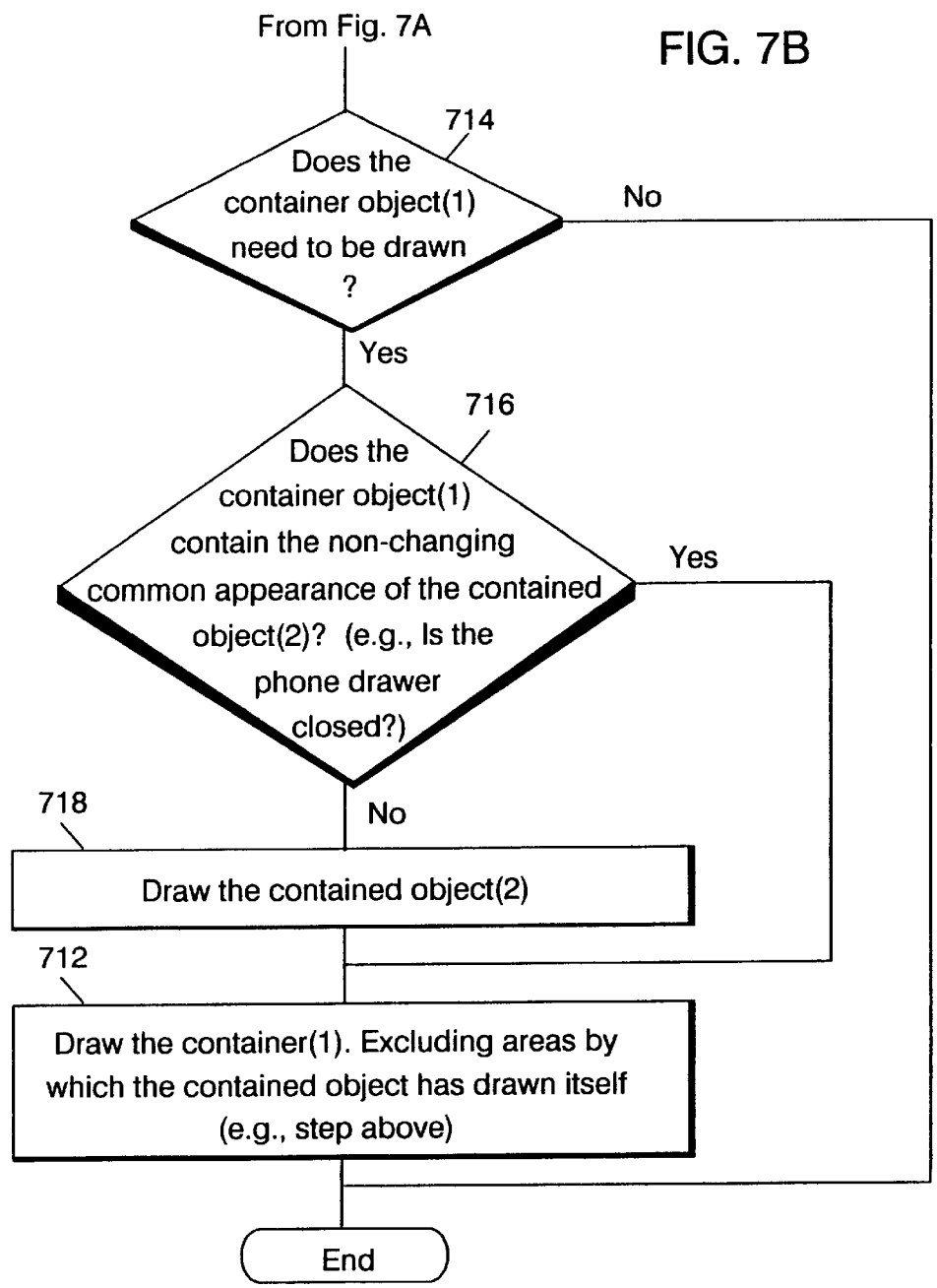

A methodology for scaling both container objects and contained objects is described in greater detail in FIGS. 7-A and 7-B. To implement the scaling technique of the present invention, an image of an object that can contain other objects must be created in step 702. Such an object may be telephone 400 or any other container object. Next, in step 704, images of contained objects that have a non-changing common appearance may be added to the image of the object that was created. An example of this is the drawer handle of pull-down drawer 412 of telephone 400.

Subsequently, in step 706, it must be determined whether or not the user desires to scale the container object. As the process for determining when a user desires to scale the container objects has previously been discussed with respect to the methodology of FIG. 6, step 706 will not be described in greater detail.

If a user does want to scale the container object, it must next be determined whether the container object contains a non-changing common appearance of the contained object. Thus, in the telephone example, it must be determined whether or not the pull-down drawer 412 is closed. If the drawer is not closed, the open drawer, is scaled in step 710. However, if the container object includes the non-changing common appearance (the pull-down 412 is closed) the container object (the telephone) is scaled accordingly in step 712.

Additionally, when the container object does not contain the non-changing common appearance of a contained object, and the contained object is scaled, the container object is subsequently scaled at a later point in time in step 712.

After the container object is scaled in step 712, or if the user does not want to scale the container object in step 706, it must next be determined whether the container object must be redrawn. The step of redrawing is typically performed after a move or a resize operation is performed. If the container object must be redrawn, it must next be determined whether or not the container object includes the non-changing common appearance of the contained objects (in step 716). Stated another way and using the telephone example, it must be determined whether pull-down drawer 412 is closed. If the container object does not contain the non-changing common appearance of the contained object, the contained object is then drawn in step 718. Subsequently, the container is then drawn in step 720.

Furthermore, in step 720, when the container is drawn, areas in which the contained object has drawn itself are excluded. Referring back to step 716, when the container object does contain the non-changing common appearance of the contained object, step 720 is executed and the container is drawn. Again, areas by which the contained object has drawn itself are excluded.

By providing the resize support for real-world objects as described above, the objects may be resized in a thoroughly natural manner. Resizing will occur in two directions, horizontal and vertical, with an anchor point being determined based on a quadrant of the object which was accessed. This allows the proportionality of the objects appearance to always be maintained. Furthermore, the recognition that a composite image includes a container and a contained object which has a common non-changing representation also adds to the efficiency and natural appearance of move and resize operations in the present invention. The combination of these methodologies results in a natural and intuitive resizing technique that will be comfortable to current users of windowed systems while maintaining the look and feel of the real-world object paradigm.

By now it should be apparent that there has been provided a data processing system and methodology for resizing a realistically-rendered object from the display device. There are many additional configurations for implementing the inventions described above. Furthermore, while there may have been described herein the principles of the invention, it is to be clearly understood to those skilled in the art that this description is made by way of example and not as a limitation to the scope of the invention. Accordingly, it is intended, by the independent claims, to cover all modifications of the invention which fall within the true spirit and scope of the invention.

What is claimed is:

1. A data processing system, comprising:
    a display device for displaying a composite image having a container object and a contained object, wherein the composite image is in a non-changing state when the contained object is in a first state and the composite image is in a changing state when the contained object is in a second state:
    a user interface for receiving a plurality of control inputs for controlling an appearance of the composite image displayed by the display device; and
    a data processor, comprising a central processing unit, wherein the central processing unit is coupled to the user interface for receiving the plurality of control inputs and coupled to the display device to provide a plurality of control signals for scaling the container object and the contained object concurrently when the contained object is in the first state, and for scaling the container object and the contained object consecutively when the contained object is in the second state.

2. The data processing system of claim 1 wherein the plurality of object control signals scale the composite image by modifying a size of the composite image.

3. The data processing system of claim 2 wherein the appearance of an container and an appearance of the contained object are proportionally modified.

4. The data processing system of claim 1 wherein the contained object is in the first state when the contained object is inaccessible for providing a data value.

5. The data processing system of claim 1 wherein the contained object is in the second state when the contained object is currently accessible for providing a stored data value.

6. The data processor of claim 1 wherein the contained object is depicted within the container object displayed on the display device.

7. The data processor of claim 1 wherein the contained object is integral to the container object displayed on the display device.

8. The data processing system of claim 1 wherein an image of said contained object in said second state and an image of said container object are non-overlapping.

9. A method for operating a data processing system, comprising the steps of:
    displaying a container object and a contained object on a display device;
    receiving a plurality of control inputs from the user interface for controlling an appearance of the container object display by the display device;
    scaling the container object in response to the plurality of control inputs to generate a scaled container object; and
    scaling the contained object in response to the plurality of control inputs to generate a scaled contained object wherein the steps of scaling the container object and contained object are concurrent when the contained object is in a first state and consecutive when the contained object is in a second state.

10. The method of claim 9, further comprising the step of: providing a scale message from the container object to the contained object.

11. The method of claim 10 wherein the scale message results in the contained object being scaled in proportion to the scaled container object.

12. The method of claim 9 wherein the contained object is depicted within the container object displayed on the display device.

13. The method of claim 9 wherein the contained object is integral to the container object displayed on the display device.

14. The method of claim 9 wherein an image of said contained object in said second state and an image of said container object are non-overlapping.

15. A method for operating a data processing system, comprising the steps of:
    displaying a container object which comprises a contained object in one of a first state and a second state on a display device;
    receiving a plurality of control inputs from a user interface for controlling an appearance of the container object displayed by the display device;
    scaling the container object and the contained object concurrently when the contained object is in the first state; and scaling the container object and the contained object consecutively when the contained object is in the second state.

16. The method of claim 15 wherein the contained object is scaled proportionally to the scaled container object.

17. The method of claim 15 wherein the contained object is a text object.

18. The method of claim 15 wherein the contained object is a function object.

19. The method of claim 15 wherein the contained object is in the first state when the contained object is inaccessible for providing a data value.

20. The method of claim 15 wherein the contained object is in the second state when the contained object is currently accessible for providing a stored data value.

21. The method of claim 15 wherein an image of said contained object in said second state and an image of said container object are non-overlapping.

22. A computer program stored on a storage media, for scaling an object on a display device, the computer program comprising the steps of:

enabling the display device to display a container object which comprises a contained object in one of a first state and a second state;

receiving a plurality of control inputs from a user interface for controlling an appearance of the container object displayed by the display device;

scaling the container object and the contained object concurrently when the contained object is in the first state; and scaling the container object and the contained object consecutively when the contained object is in the second state.

23. The computer program product of claim 22 wherein an image of said contained object in said second state and an image of said container object are non-overlapping.

24. The computer program of claim 22 wherein the contained object is a text object.

25. The computer program of claim 22 wherein the contained object is a function object.

26. The computer program of claim 22 wherein the computer program includes the step of providing a scale message from the container object to the contained object.

27. The computer program product of claim 26 wherein the scale message results in the contained object being scaled in proportion to the scaled container object.

28. The computer program of claim 22 wherein the contained object is integral to the container object displayed on the display device.

* * * * *